(12) United States Patent
Nickel

(10) Patent No.: US 6,173,741 B1
(45) Date of Patent: Jan. 16, 2001

(54) PRESSURE COMPENSATING VALVE FOR A FUEL TANK

(75) Inventor: Hans Nickel, Cottenweiler (DE)

(73) Assignee: Andreas Stihl AG & Co., Waiblingen (DE)

( * ) Notice: Under 35 U.S.C. 154(b), the term of this patent shall be extended for 0 days.

(21) Appl. No.: 09/505,726

(22) Filed: Feb. 17, 2000

(30) Foreign Application Priority Data

Feb. 27, 1999 (DE) ................................................ 199 08 587

(51) Int. Cl.[7] ...................................................... F16K 31/12
(52) U.S. Cl. ........................ 137/587; 137/494; 137/907; 123/510
(58) Field of Search ..................................... 137/587, 907, 137/494, 588; 220/89.1; 123/510

(56) References Cited

U.S. PATENT DOCUMENTS

| | | | |
|---|---|---|---|
| 2,631,600 | * 3/1953 | Flanagan | 137/509 |
| 2,675,793 | * 4/1954 | Ziege | 137/588 |
| 2,946,341 | * 7/1960 | Sullivan | 137/496 |
| 2,988,097 | * 6/1961 | Benzel | 137/494 |
| 3,746,036 | * 7/1973 | Bois et al. | 137/496 |
| 3,974,851 | * 8/1976 | Garrelson | 137/494 |

FOREIGN PATENT DOCUMENTS

709488  * 5/1931 (FR) ..................................... 123/511

* cited by examiner

Primary Examiner—A. Michael Chambers
(74) Attorney, Agent, or Firm—Walter Ottesen

(57) ABSTRACT

A pressure compensating valve is configured as a pressure control valve for a fuel tank. The valve body is operatively connected to a membrane via a two-arm valve lever so that, when there is an underpressure in a control chamber, which is bounded by the membrane, the membrane is displaced in the direction toward the lever. The lever is then pivoted and opens the valve for pressure compensating the fuel tank by allowing air to flow in.

13 Claims, 1 Drawing Sheet

PRESSURE COMPENSATING VALVE FOR A FUEL TANK

FIELD OF THE INVENTION

Figure 1:
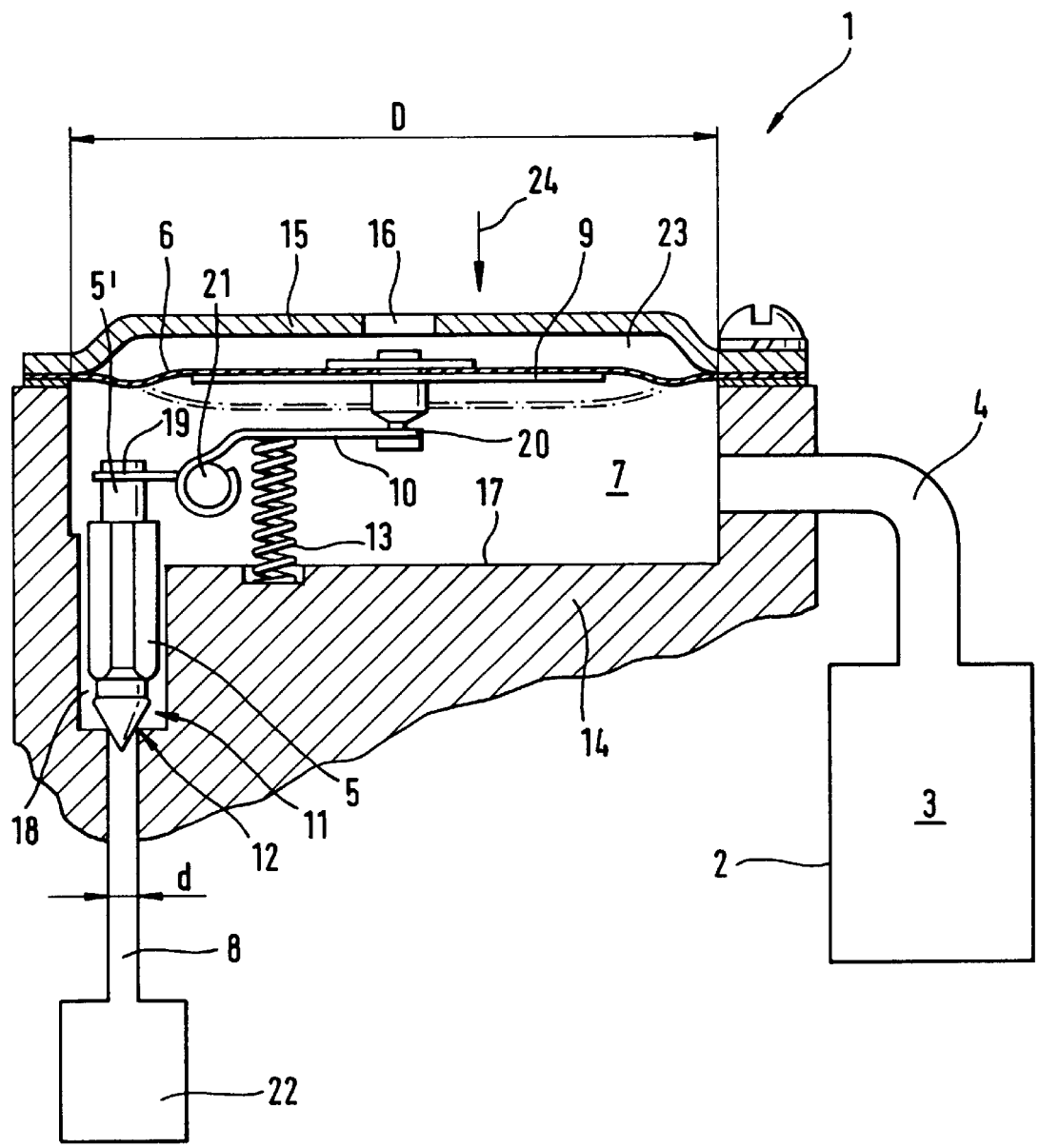

The invention relates to a pressure compensating valve for a fuel tank, in particular for a fuel tank of a work tool such as a motor-driven chain saw, cutoff machine, brushcutter, et cetera, driven by an internal combustion engine. Such a pressure compensating valve includes a pressure compensating channel opening into the tank interior. The pressure compensating channel can be closed off by a valve body seated seal-tight on a valve seat. The valve body lifts off the valve seat when an underpressure is present within the tank interior to open the pressure compensating channel to the atmosphere.

BACKGROUND OF THE INVENTION

Pressure compensating valves for fuel tanks are known in several configurations. For example, U.S. Pat. No. 5,526,843 discloses a mushroom-shaped valve body made of a rubber-elastic material having an outer head portion resting seal-tight against the valve seat. In order to ensure pressure compensation of the tank interior at minimal underpressures, the valve body must therefore be of soft-elastic material. However, this entails problems when overpressures are present because the valve body then yields easily and can become deformed so that leaks may occur.

The minimal closing forces of the mushroom-shaped valve at normal pressure also entail the risk that a proper closing and opening of the mushroom-shaped valve can no longer be ensured when residues, foreign bodies, et cetera, are deposited on the valve seat.

SUMMARY OF THE INVENTION

The invention has the object to improve an pressure compensating valve of the above-mentioned kind such that it opens and permits pressure compensation already at minimal underpressures but is reliably closed at overpressures without mechanically overloading the valve.

The pressure compensating valve arrangement of the invention is for a fuel tank and defines a tank interior wherein an underpressure can develop. The arrangement includes: a housing defining an interior space; a membrane mounted in the interior space so as to define a control chamber therein bounded by the membrane; a pressure compensating channel opening into the control channel and communicating with the tank interior; the membrane having a first side facing toward the control chamber and the tank interior and a second side facing away from the control chamber; a reference pressure source for charging the second side of the membrane with a reference pressure; the membrane being a deflectable membrane which deflects in response to the underpressure when the underpressure is less than the reference pressure; a valve unit mounted in the housing and defining an interface between the control chamber and the ambient atmosphere; the valve unit including a valve seat defining a passage between the ambient atmosphere and the control chamber; and, a valve body moveable between an open position wherein the tank interior communicates with the ambient atmosphere via the control chamber to allow air to flow in a flow direction from the ambient atmosphere into the tank interior and a closed position wherein the valve body rests seal tight against the valve seat to seal off the tank interior from the ambient atmosphere; and, connecting means for operatively connecting the valve body to the deflectable membrane so as to cause the valve body to move into the open position from the closed position in response to the deflection of the membrane caused by the underpressure thereby allowing air to flow in the flow direction into the fuel tank.

The control of the valve body via a membrane charged by the pressure within the fuel tank ensures, on the one hand, a safe sealing action at overpressures and, on the other hand, an adjusted pressure compensating action at underpressures. A fine-tuned valve response is adjustable via the dimensions of the membrane even at minimal underpressures.

The valve body is suitably held in the closed position by a spring. The biasing force of the spring is selected according to the desired opening pressure of the pressure compensating valve. The valve body can be configured as a plunger which is longitudinally moved for closing or opening the valve. In a preferred embodiment of the pressure compensating valve of the invention, the membrane is fixedly connected to a membrane plate which is operatively connected to the valve body via a two-arm valve lever. When the pressure in the control chamber drops below a predetermined difference value relative to the reference pressure, thus causing the membrane to be moved counter to the biasing force of the spring, the membrane plate moved with the membrane actuates the valve plunger by pivoting the valve lever.

A simple configuration of the pressure compensating valve is realized when the ambient pressure acts as a reference pressure on the membrane. The reference volume at the side of the membrane facing away from the control chamber communicates with the atmosphere.

The valve is very responsive when the cross section of the control chamber acting on the membrane is a multiple greater than the pipe cross section of the pressure compensating line closeable by the valve. In addition to selecting the dimensions of the membrane, the adjustment of the responsiveness of the pressure compensating valve can also be adjusted via the lengths of the lever arm of the valve lever and/or the biasing force of the valve spring.

BRIEF DISCRETION OF THE DRAWING

The invention will now be described with reference to the single FIGURE (FIG. 1) showing schematically the basic configuration of the pressure compensating valve arrangement of the invention.

DESCRIPTION OF THE PREFERRED EMBODIMENTS OF THE INVENTION

FIG. 1 shows schematically the configuration of the pressure compensating valve 1 of the invention for pressure compensating a tank for a liquid. The tank is especially a fuel tank 2 used in work tools, for example, a motor-driven chain saw, cutoff machine, brushcutter, et cetera, which are driven by an internal combustion engine. A pressure compensating channel 4 opens into the tank interior 3 and is connected via a pressure compensating or aerating line 8 and an air filter 22 to the atmosphere.

The filling stub (not shown) of the fuel tank 2 can be pressure-tightly closed by a fuel tank cap.

The pressure compensating valve 1 is arranged between the pressure compensating channel 4 and the pressure compensating line 8. A membrane 6 delimits a control chamber 7 in the interior space 23 of the valve housing 14. The pressure compensating channel 4 opens into the control chamber 7. The diameter D of the interior space 23, and therefore also of the control chamber 7, is several times greater than the diameter d of the line in the vicinity of the valve seat. This line can be closed off by the valve 1. In the present embodiment, this line is the pressure compensating or aerating line 8.

The interior space 23 of the valve housing 14 is closed by a cover 15. The membrane 6 partitions the interior space 23 into the control chamber 7 and a residual volume 26 which communicates with the atmosphere via a through opening bore 16. The side of the membrane 6 facing away from the control chamber 7 is thus charged with the ambient pressure acting as a reference pressure relative to the pressure in the control chamber 7.

The membrane 6 is fixedly connected to a membrane plate 9 which rests on a lever arm 20 of a two-arm valve lever 10. The valve lever 10 is pivotally journalled on a pin 21 so as to be rotatable about a pivot axis defined by the pin and the second lever arm 19 is connected to a valve body 5. The valve body 5 is configured as a valve plunger with a cone-shaped closure member 11 which can be lifted off the valve seat 12. The valve seat 12 is defined by the opening of the pressure compensating line 8 into the control chamber 7. The lever arm 19 of the valve lever 10 is fastened to the end 5' of the valve plunger 5 lying opposite the closure member 11. A coil spring 13 is supported on the inner wall 17 of the valve housing 14 and engages the lever arm 20 of the valve lever 10 on which the membrane plate 9 rests. The coil spring 13 holds the valve plunger 5 in the closed position via the valve lever 10.

The stroke movement of the valve plunger 5 is coupled via the valve lever 10 to the deflection of the membrane 6. When an underpressure relative to the atmosphere is present in the fuel tank 2 and therefore in the control chamber 7, the membrane 6 is deflected causing a reduction of the volume of the control chamber 7 and the valve lever 10 is pushed down by the membrane plate 9 counter to the biasing force of the coil spring 13. The membrane 6 is moved into the position shown by the broken line in FIG. 1 which corresponds to the open position of the pressure compensating valve 1 so that the valve plunger 5 is lifted off the valve seat 12 via the valve lever 10. The flow connection between the pressure compensating line 8 and the fuel tank 2 is now open. As soon as a pressure compensation between the pressure in the control chamber 7 and the ambient pressure has occurred because of the flow of air into the fuel tank 2, the coil spring 13 forces the valve plunger 5 into the closed position and the closure member 11 onto the valve seat 12.

In the case of an overpressure in the fuel tank 2, the membrane plate 9 lifts off the valve lever 10 so that the overpressure can be compensated by volume expansion of the control chamber 7.

In the configuration shown, the valve lever 10 is provided with lever arms (19, 20) positioned opposite one another relative to the pivot axis 21 so that the opening lifting movement of the valve plunger 5 is carried out counter to the deflection of the membrane 6 in the direction of arrow 24 when an underpressure is present in the control chamber 7. The membrane-controlled pressure compensating valve 1 can be responsive already at minimal underpressures in the control chamber 7 for facilitating the flow of air into the fuel tank 2. The opening pressure, or the pressure difference between the control chamber 7 and the atmosphere at which the pressure compensating valve 1 is responsive, can be adjusted as needed by the dimensions of the membrane 6 and, in addition, by a suitable matching of the lever arm lengths of the valve lever 10 as well as of the biasing force of the valve spring 13.

In the shown embodiment, the pressure compensating valve has a compact configuration with an arrangement of the valve plunger 5 in a plunger cavity 18 which is formed as a recess in the valve housing 14. The pressure compensating line 8 opens into the plunger cavity 18, and the valve seat 12 is formed in the bottom of the plunger cavity 18 at the opening of the pressure compensating line 8. The valve plunger 5 is essentially accommodated in the plunger cavity 18 and projects with its end 5' opposite the closure member 11 into the control chamber 7. The end 5' is connected to the lever arm 19 of the valve lever 10. The plunger cavity 18 can be dimensioned such that it provides a guide for the valve plunger 5. Between the valve plunger 5 and the inner wall of the plunger cavity 18, a space is provided through which the pressure compensating air can flow into the control chamber 7 and then through the pressure compensating channel 4 into the fuel tank 2 once the closure member 11 has lifted off the valve seat 12.

The pressure compensating valve 1 of the invention thus functions as a pressure controller wherein the response behavior and thus the opening pressure of the pressure compensating valve 1 are adjustable via its configuration. Accordingly, a pressure compensating flow of air into the fuel tank 2 is possible while a build up of an overpressure in the fuel tank augments the closing action in the closed position of the valve plunger 5. When an overpressure is present in the fuel tank, a pressure compensation of the fuel tank relative to the ambient cannot take place.

It is understood that the foregoing description is that of the preferred embodiments of the invention and that various changes and modifications may be made thereto without departing from the spirit and scope of the invention as defined in the appended claims.

What is claimed is:

1. A pressure compensating valve arrangement for a fuel tank defining a tank interior wherein an underpressure can develop, the arrangement comprising:

a housing defining an interior space;

a membrane mounted in said interior space so as to define a control chamber therein bounded by said membrane;

a pressure compensating channel opening into said control channel and communicating with said tank interior;

said membrane having a first side facing toward said control chamber and said tank interior and a second side facing away from said control chamber;

a reference pressure source for charging said second side of said membrane with a reference pressure;

said membrane being a deflectable membrane which deflects in response to said underpressure when said underpressure is less than said reference pressure;

a valve unit mounted in said housing and defining an interface between said control chamber and the ambient atmosphere;

said valve unit including a valve seat defining a passage between said ambient atmosphere and said control chamber; and, a valve body moveable between an open position wherein said tank interior communicates with the ambient atmosphere via said control chamber to allow air to flow in a flow direction from the ambient atmosphere into said tank interior and a closed position wherein said valve body rests seal tight against said valve seat to seal off said tank interior from the ambient atmosphere; and, connecting means for operatively connecting said valve body to said deflectable membrane so as to cause said valve body to move into said open position from said closed position in response to the deflection of said membrane caused by said underpressure thereby allowing air to flow in said flow direction into said fuel tank.

2. The pressure compensating valve arrangement of claim 1, said connecting means comprising a valve spring for resiliently biasing said valve body into said closed position.

3. The pressure compensating valve arrangement of claim 2, said valve body being a valve plunger defining a longitudinal axis and being moveable in a direction of said longitudinal axis.

4. The pressure compensating valve arrangement of claim 3, said connecting means further comprising: a membrane plate fixedly connected to said membrane so as to deflect therewith; a two-arm valve lever pivotally mounted in said housing and having a first arm connected to said valve body and a second arm operatively connected to said membrane plate.

5. The pressure compensating valve arrangement of claim 4, said two-arm valve lever having a pivot axis about which said valve lever is pivotable; and, said first and second lever arms being arranged opposite one another relative to said pivot axis.

6. The pressure compensating valve arrangement of claim 4, wherein the pressure for opening said pressure compensating valve is determined by one or more parameters selected from at least one of the following: one or more dimensions of said deflectable membrane; a length ratio of said first and second lever arms; and, the biasing force of said valve spring.

7. The pressure compensating valve arrangement of claim 4, said membrane plate resting on said second arm so as to be liftable therefrom.

8. The pressure compensating valve arrangement of claim 7, said housing being a valve housing and said valve housing having an inner wall defining said interior space; and, said deflectable membrane being arranged in said interior space so as to partition said interior space into said control chamber and a reference volume defining said reference pressure source.

9. The pressure compensating valve arrangement of claim 8, said reference volume communicating with the ambient atmosphere which acts on said second side of said deflectable membrane.

10. The pressure compensating valve arrangement of claim 8, further comprising a pressure compensating line defining an opening communicating with said control chamber and said valve seat being formed at said opening.

11. The pressure compensating valve arrangement of claim 10, said valve housing having a plunger chamber and said valve plunger being mounted in said plunger chamber; said plunger chamber having a bottom and said valve seat being arranged at said bottom; said valve plunger having an end remote from said bottom and projecting into said control chamber; and, said end being connected to said first lever arm.

12. The pressure compensating valve arrangement of claim 10, said control chamber having a cross-sectional surface area over which the underpressure present in said tank interior acts on said first surface of said deflectable membrane and said pressure compensating line having a cross section opened when said valve body is in said open position; and, said cross-sectional surface area of said control chamber being greater than said cross section of said pressure compensating line by a predetermined multiple.

13. The pressure compensating valve arrangement of claim 8, said valve spring being a coil spring having a first end supported on said first lever arm and a second end supported on said inner wall of said valve housing.

* * * * *